United States Patent

[11] 3,619,255

| [72] | Inventor | Guenther Fritz Lengnick<br>Mantiou Beach, Mich. |
|---|---|---|
| [21] | Appl. No. | 875,485 |
| [22] | Filed | Nov. 10, 1969 |
| [45] | Patented | Nov. 9, 1971 |
| [73] | Assignee | Stauffer-Wacker Silicone Corporation<br>Adrian, Mich.<br>Continuation-in-part of application Ser. No. 661,544, Aug. 18, 1967, now abandoned. |

[54] SUBSTRATE COATED WITH AN ORGANOPOLYSILOXANE EMPLOYING A PRIMER COMPRISING A TITANATE AND AN ORGANOPOLYSILICATE
5 Claims, No Drawings

[52] U.S. Cl............................................. 117/75,
117/72, 117/76, 117/124, 117/132, 117/138.8,
260/46.5
[51] Int. Cl........................................ B32b 15/08,
B32b 17/10, B32b 27/08

[50] Field of Search............................................ 117/72, 75,
124 F, 132 BS, 123 D; 156/329

[56] References Cited
UNITED STATES PATENTS

| 2,751,314 | 6/1956 | Keil............................ | 117/72 |
| 3,109,013 | 10/1963 | Haluska...................... | 156/319 X |
| 3,258,382 | 6/1966 | Vincent...................... | 117/155 X |
| 3,321,350 | 5/1967 | Fekete........................ | 260/448.2 X |

Primary Examiner—William D. Martin
Assistant Examiner—Ralph Husack
Attorneys—Marion D. Ford, Robert C. Sullivan and Lloyd L. Mahone ABSTRACT: This invention relates to a primer composition comprising a solution of organosilicates and condensed titanates of the formula $(Ti)_n(O)_m(OR)_p$, wherein R is an organic radical having from one to 20 carbon atoms, $n$ is an integer of at least 2, $m$ is an integer of at least 1 and $p$ is an integer of at least 4 and use of the primer composition to adhere silicone rubber to substrates.

SUBSTRATE COATED WITH AN ORGANOPOLYSILOXANE EMPLOYING A PRIMER COMPRISING A TITANATE AND AN ORGANOPOLYSILICATE

This application is a continuation-in-part of Ser. No. 661,544, filed Aug. 18, 1967, and now abandoned. The present invention relates to a primer composition for silicone rubber adhesion comprising a solution of partially hydrolyzed titanates and organopolysilicates and to a method for applying the same.

Organopolysiloxanes have found wide industrial applications because of their thermal stability, dielectric properties and resistance to atmospheric deterioration. Because of these properties, the organopolysiloxanes are usable under conditions where corresponding organic materials are of no value. It has long been desired to prepare a commercially useful organopolysiloxane coated substrate which would provide satisfactory bonding between silicone rubber and the substrate, particularly over a wide range of extreme temperatures.

The heretofore known primers and methods for achieving bonding between a silicone rubber and a solid substrate have been unsatisfactory for a number of reasons, including unsatisfactory bonding at extremes of temperature, i.e., −50° to 250° C., failure of the bond with time, inadequate bonding and a host of other deficiencies.

Due to the fact that silicone rubber has a wide variety of uses, it has lead to a search for methods for bonding the rubber to other materials. The use of various primers, cements and other intermediate layers between silicone rubber and the base member have been proposed. Some of the proposed methods are quite effective for bonding silicone rubber to a specific base material, yet are ineffective for bonding to other materials. Other methods provide an effective bond or adhesion but introduce undesirable characteristics over an extreme temperature range.

It is quite apparent that it is necessary to provide a primer which may be applied to several substrates for adhering silicone rubber thereto and which will provide a satisfactory bond over a wide temperature range.

It is therefore an object of this invention to provide a novel primer composition. Another object of this invention is to provide a novel method for bonding any silicone rubber to any solid substrate. Still another object of this invention is to provide a method for adhering silicone rubber to substrates without requiring high temperature cure. A further object of this invention is to provide a novel silicone rubber coated substrate.

The foregoing objects and others which will become apparent from the following description are accomplished in accordance with this invention, generally speaking, by providing a novel primer composition comprising a solution of organosilicates and partially hydrolyzed organotitanates.

In other words, this invention relates to a primer composition which may be applied to a solid substrate comprising from about 2 to about 50 percent by weight of a condensed titanium compound of the formula $(Ti)_n (O)_m (OR)_p$ wherein R is an organic radical having from one to 20 carbon atoms, $n$ is an integer of at least 2, $m$ is an integer of at least 1 and $p$ is an integer of at least 4 and from 2 to 30 percent by weight of a partially hydrolyzed organopolysilicate and thereafter depositing on the primed surface a silicone rubber.

The titanium compounds serving as priming agents are attained from partially hydrolyzed titanate esters having the general formula $Ti(OR)_4$, where R is the same as that represented above. The various R groups on any one Ti atom can be the same or different. It is preferred that R be selected from the group consisting of aliphatic hydrocarbon radicals halo- and cyano- substituted aliphatic hydrocarbon radicals and hydroxylated aliphatic hydrocarbon radicals having up to 12 carbon atoms and more preferably having from one to six carbon atoms. Examples of titanium compounds operative herein include partially hydrolyzed tetraethyl titanate, tetraisopropyl titanate, tetra-n-butyl titanate, tetradecyl titanate, octyleneglycol titanate, tetra-2-ethylhexyl titanate, tetradodecyl titanate, tetrabenzyl titanate, tetrastearyl titanate and mixtures thereof.

These esters are generally prepared by an ester interchange employing a titanium ester such as tetraethyl titanate with a higher boiling alcohol such as octyleneglycol. The partially hydrolyzed titanium compounds should not be hydrolyzed to the extent that these compounds are insoluble in hydrocarbon solvents such as toluene. The partially hydrolyzed titanium compounds described above are mixed with from about 2 to 30 percent by weight of organosilicates, preferably partially hydrolyzed organopolysilicates. Examples of suitable alkylpolysilicates are methylpolysilicate, ethylpolysilicates butylpolysilicate, tetraethyl orthosilicate, beta-chloroethyl orthosilicate, 2-methoxyethyl orthosilicate, orthochlorophenyl orthosilicate and mixtures thereof.

The titanium compounds or mixtures thereof and organosilicates are applied to a solid substrate by any suitable means as a solution comprising from about 2 to 50 percent, preferably from about 5 to 15 percent by weight of a titanium compound or mixture of titanium compounds and from about 2 to 30 percent, preferably from about 3 to 10 percent of an organosilicate and an organic solvent such as xylene, toluene and/or Stoddard solvent. The titanium compound and organosilicate forms a continuous film on the substrate as the solvent evaporates. To the coated substrate is then applied an organopolysiloxane having the formulae

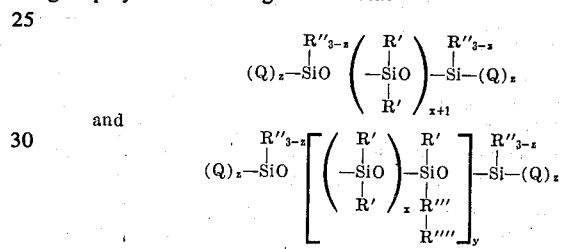

and wherein the R'(s), which may be the same or different and R'' represent monovalent hydrocarbon radicals, halogenated monovalent hydrocarbon radicals or cyanoalkyl radicals; R''' is a divalent hydrocarbon radical, a divalent halogenated hydrocarbon radical or a divalent cyanoalkyl radical having up to 18 carbon atoms; R'''' is an olefinic monomeric or low molecular weight polymer connected to R''' through a carbon to carbon linkage; Q is a radical hydrolyzable by ambient moisture; z is a number of from 1 to 3; x is a number of from 0 to 20,000 and y is a number of from 1 to 500. In the above formulae, R' and R'' are organic radicals selected from the group consisting of alkyl radicals having from one to 18 carbon atoms such as methyl, butyl, hexyl, decyl, tetra-decyl, octadecyl; aryl radicals such as phenyl, diphenyl, naphthyl and the like; alkaryl radicals such as tolyl, xylyl, ethylphenyl and the like; aralkyl radicals such as benzyl, phenylethyl and the like; halo-aryl radicals such as chlorophenyl, tetra-chlorophenyl, difluorophenyl and the like; alkenyl radicals such as vinyl, allyl and the like. Examples of suitable divalent radicals represented by R''' are methylene, trimethylene, hexamethylene, octamethylene, decamethylene, octadecamethylene, phenylene, and diphenylene. Examples of hydrolyzable groups represented by Q above are monoacyl radicals of carboxylic acids such as formoxy, acetoxy, amyloxy, valeroxy, caproxy, mistryloxy and stearoxy radicals; carbonoxy groups having from one to 10 carbon atoms such as methoxy, butoxy, octoxy, decoxy, phenoxy and the like; aminooxy groups such as dimethylaminooxy, diethylaminooxy, dipropylaminooxy, dibutylaminooxy dioctylaminooxy, diphenylaminooxy, ethylmethylaminooxy, methylphenylaminooxy; amino radicals of the formula $NH_pR'_{2-p}$, where R' is an alkyl radical of from one to 18 carbon atoms and $p$ is 1 or 2; oximo radicals such as acetophenoximo, acetoximo, benzophenoximo, 2-butanoximo, diisopropylketoximo, chlorocyclohexanoximo, alpha-bromoacetophenoximo and the like.

Organopolysiloxanes containing acyloxy groups may be prepared by reacting hydroxyl-terminated organopolysiloxanes with acyloxysilanes in a ratio of at least one mole of acyloxysilane per mole of silicon bonded hydroxyl group at a temperature ranging from about 20° to 100° C.; however, higher or lower temperatures may be used if desired, although it is preferred that the reaction be carried out at temperatures below about 200° C.

Where the hydrolyzable groups on the organopolysiloxane are halo- or keto-oximo groups, they may be prepared by reacting hydroxyl-terminated organopolysiloxane fluids of suitable viscosity with the product attained from the reaction of organotrihalosiloxanes and an aldo- or keto-oxime. The organopolysiloxanes may be homopolymers as well as copolymers, that is compounds derived from two to more different diorganosilanes and even the organic radicals linked to any particular silicon may be different organic radicals. Especially useful are the dimethylpolysiloxanes, methylphenylpolysiloxanes and methylvinylpolysiloxanes.

In the formation of the grafted organopolysiloxanes, the monomeric or low molecular weight polymeric groups are grafted to the conventional hydroxyl-terminated organopolysiloxanes by using any free-radical initiator, normally a peroxide in concentrations of from about 0.05 percent up to about 2 percent based on the weight of the reactants.

In using a free-radical initiator, the reaction when, carried out in a batchwise process, generally proceeds at a satisfactory rate if the temperature is maintained in a range of from about 60° to 130° C. Where a continuous process is used or if the reaction is carried out in the absence of a free-radical initiator, a substantially higher temperature such as up to about 160° C. may be advantageously used.

Examples of suitable peroxide initiators are those having at least one of the peroxide oxygens attached to a tertiary-carbon atom such as dialkyl peroxides, i.e. di-tert-butyl and dicumyl-peroxide; hydroperoxides such as tert-butylhydroperoxide, cumylhydroperoxide and decalinhydroperoxide; cyclic peroxides such as ascaridole and 1,5-dimethylhexane-1,5-peroxide and peresters such as tert-butyl perbenzoate, tert-butylperoxyisopropyl carbonate and tert-butyl peroctoate. Other peroxides which may be used are ketone peroxides such as acetone peroxide and cyclic hexanone peroxide.

Aryl peroxides and peracids may be used as initiators in the formation of graft polymers, however, these initiators result in less grafting, i.e. lower yields of the grafted product. The difference is believed to lie in the nature of the radicals produced, thus tertiary-oxy radicals from di-tert-butyl peroxide, for example, have a strong tendency to abstract hydrogen atoms which is a necessary step in the grafting procedure. On the other hand, acyloxy radicals produced from acylperoxide, e.g. benzylperoxide, while effective initiators are relatively ineffective as hydrogen abstractors.

Although it may be possible to carry out the grafting procedure using organopolysiloxanes free of terminal hydroxyl groups or groups hydrolyzable by ambient moisture and to subsequently treat the graft polymer to incorporate such groups, it is preferred in the grafting operation to start with organopolysiloxanes having terminal-hydroxyl groups. Following this procedure, the graft polymer is appropriately treated to convert the hydroxyl groups to groups which are hydrolyzable by ambient moisture.

The hydroxyl-terminated organopolysiloxanes may contain in minor proportion molecules having only one hydroxyl group or there may be a smaller number of molecules carrying in excess of two hydroxyl groups. It is preferred in any event, that the hyroxyl-terminated organopolysiloxane have an average of 1.75 to about 2.25 hydroxyl groups per molecule.

The proportion of organic monomer or low molecular weight polymer used in the grafting reaction may be varied within wide limits. However, it has been found that greatly improved physical properties have been obtained when a reaction mixture contains from about 25 to 75 percent by weight of organic units. It is preferred that the organic monomer or polymer proportion account for from about 40 to 65 percent of the total weight of the reactants.

Monomeric compounds which may be used in the grafting of the organopolysiloxanes include both branched and straight chain olefins having from one to 18 carbon atoms. Examples of suitable aliphatic hydrocarbons are ethylene, butylene, octylene, dodecene, hexadecene, octadecene; unsaturated aromatic hydrocarbons such as styrene, alpha-methylstyrene, alpha-butylstyrene; halogenated hydrocarbons such as chlorostyrene, 1,1-dichloroethylene, fluoroethylene; unsaturated acids such as vinyl acetic acid, acrylic acid, methacrylic acid, cinnamic acid, lauric acid, linoleic acid; esters of organic acids such as vinyl acetate, vinyl butyrate, vinyl benzoate, vinyl p-chlorobenzoate, methyl methacrylate, ethyl methacrylate, octyl methacrylate, vinyl alpha-chloroacetate, allyl butyrate, diallyl fumarate, diallyl benzoate, allyl acrylate; organic nitriles such as acrylonitrile, methacrylonitrile, crotonitrile; vinyl aromatics such as vinyl pyridine, vinyl naphthylene, divinyl benzene; di-substituted ethylenes such as vinylidene chloride, vinylidene fluoride, vinylidene cyanide as well as maleic anhydride, stilbene, indene, coumarone and the like.

The ratio of condensed titanium compounds to organosilicates is not critical and may range from about 0.25 to 5:1, preferably from about 1:1 and more preferably 2:1 or above.

The primer compounds, as indicated hereinbefore, is applied dissolved in a suitable solvent. Hydrocarbon and chlorohydrocarbon solvents, e.g., benzene, xylene, toluene, cyclohexane, heptane, methylene chloride, dichlorobenzene and the like are generally applicable as are dialkyl esters of mono- and poly-alkylene glycols.

For most applications, either methylene chloride or toluene is recommended as a solvent. Using such a solvent, the primer is generally applied as a 5 to 25 weight percent solution when bonding silicone rubber to metal or ceramic surfaces. Particularly good results at these concentrations in methylene chloride have been achieved using hexa-iso-propoxytitanate and ethyl orthosilicate as the primer composition.

The primer composition may be applied in any suitable manner including brushing, dipping and spraying. Either smooth or rough surfaces may be effectively primed. In the case of metals, the surface should be thoroughly cleaned of oxide, grease and other contaminates using appropriate methods such as vapor degreasing, acid cleaning, light sanding followed by wiping with a degreasing solvent or sand or grit blasting. Acid cleaned steel should be dried immediately after the water rinse to prevent rusting, a hot air circulating oven being suggested in this connection. Before the application of the silicone rubber, the primed surface should be allowed to dry completely to assure complete evaporation of the solvent and thorough activation of the primer compound which hydrolyzes in the presence of the moisture contained in the ambient air. As would be obvious, activation of the primer proceeds at a slower rate at a low humidity. The drying process is accelerated through the use of hot air oven. A primed article following removal, should be allowed to set for about 30 minutes before the application of the silicone rubber.

The silicone rubber described above is applied over the primer in an unvulcanized state. The vulcanization of the rubber may occur in the presence of ambient moisture at room temperature.

In view of the excellent results which have been obtained in the practice of the invention, it would appear that the primer compounds actually develop a covalent bond with both the silicone rubber and the substrate. Patentability of the invention, however, is not predicated on any such theoretical consideration.

The primers of this invention will adhere to any known solid surface. Thus, they may be used on flexible or nonflexible solid material such as glass, steel, aluminum, iron, urea formaldehyde and melamine formaldehyde polymers, paper, leather, acrylic polymers, poly-ethers, poly-esters, poly-amides, poly-ethylene, organic fabrics such as cotton, silk, wool, rayon and any of the various synthetic organic fabrics, wood and the like. Primers may be used in the fabrication of cable insulation, transformers and laminates. They are particularly adapted for adhering silicone rubber to metal substrates such as may be desired in cable construction. Other uses include adhering silicone rubber to metal panels such as those used in building materials, automobile bodies and fuselages of airplanes.

The invention is further illustrated by the following examples in which parts are by weight unless otherwise specified.

EXAMPLE 1

To a reactor containing about 55.4 parts of titanium tetra-isopropoxide and about 64 parts of propane-2-ol is added an aqueous solution containing about 1.16 parts of water and about 36 parts of propane-2-ol and cooled to about 30° C A white crystalline solid forms which is separated out and washed with ice cold propane-2-ol and recrystallized from about 45 parts of propane-2-ol. The final product is washed with propane-2-ol and dried at reduced pressure at room temperature. The product is identified as isopropyldiorthotitanate $(Ti_2O)(OiC_3H_7)_6$.

EXAMPLE 2

To a reactor containing about 35.6 parts of titanium tetra-tert-butoxide and about 38.4 parts of tert-butyl alcohol is added slowly with agitation at room temperature an aqueous tert-butyl alcohol solution containing about 0.96 parts of water and about 29.4 parts of tert-butyl alcohol. A white solid is slowly deposited and after about 24 hours the solid is separated and washed with tert-butyl alcohol and dried at room temperature. The product is identified as $Ti_3O_4(OBu)_4$.

EXAMPLE 3

An aqueous solution of a tert-amyl alcohol containing about 80 parts of water and about 78 parts of amyl alcohol is added to a reactor containing about 36 parts of titanium tetra-tert-amyl-oxide dissolved in about 46 parts of tert-amyl alcohol. The tert-amyl alcohol is removed at room temperature under a vacuum of about 0.1 mm. Hg yielding a liquid product. The liquid product is then distilled, yielding a residue containing a soluble product which is analyzed and identified as $Ti_6O_4(OC_5H_{11})_6$.

EXAMPLE 4

To a reactor containing about 33.6 parts of titanium tetra-isopropoxide and about 64.4 parts of propane-2-ol is added with agitation an aqueous propane-2-ol solution containing about 2.3 parts of water and about 74.8 parts of propane-2-ol. The solvent is removed under reduced pressure, yielding a brittle resin which is soluble in common organic solvents. The product is analyzed and identified as $Ti_{21}O_{24}(OiC_3H_7)_{36}$.

EXAMPLE 5

Approximately 6 parts of the condensed titanate prepared in accordance with example 1 is mixed with about 6 parts of ethyl orthosilicate in the presence of about 88 parts of ligroin under anhydrous conditions. The solution is applied by brushing to a previously cleaned and degreased metal substrate and allowed to dry for about 30 minutes in the presence of atmospheric moisture.

The coated metal substrate is then coated with an unvulcanized organopolysiloxane prepared by mixing about 100 parts of a hydroxyl-terminated polydimethylsiloxane having a viscosity of about 5,000 cs. with about 5 parts of trimethoxyacetoxysilane and about 13 parts of Cab-O-Sil. The coating is exposed to atmospheric moisture. At the end of about 3 hours, the material developed a tack-free surface and at the end of about 36 hours, the material cured to a solid elastomeric state. The peel strength is tested in accordance with the procedure described in TT-S-00230 and found to be about 19.1 pounds per square inch.

EXAMPLE 6

In accordance with the procedure described in example 5, the condensed titanate prepared in accordance with example 2 is substituted for the titanate of example 1.

A peel strength is about 20.2 pounds per square inch.

EXAMPLE 7

In accordance with the procedure described in example 5, the condensed titanate prepared in accordance with example 3 is substituted for the titanate of example 1.

The peel strength is about 17.6 pounds per square inch.

EXAMPLE 8

In accordance with the procedure described in example 5, the condensed titanate prepared in accordance with the procedure described in example 4 is substituted for the isopropyldiorthotitanate of example 1.

The peel strength is about 20.6 pounds per square inch.

EXAMPLE 9

In accordance with the procedure described in example 5, a primer composition consisting of about 6 parts of the isopropyldiorthotitanate of example 1 is mixed with about 6 parts of ethyl silicate "40" in the presence of about 88 parts of ligroin under anhydrous conditions. The solution is then applied to a previously cleaned and degreased aluminum substrate and allowed to dry for about 30 minutes in the atmosphere.

An unvulcanized organopolysiloxane composition prepared by mixing about 100 parts of a hydroxyl-terminated dimethylpolysiloxane having a viscosity of about 10,000 cs. with about 5 parts of ethoxy-triacetoxysilane is applied to the previously primed aluminum substrate and exposed to atmospheric moisture.

The peel strength is determined in accordance with the procedure described in TT-S-00230 and found to be about 20.3 pounds per square inch.

EXAMPLE 10

In accordance with the procedure described in example 5, the primer composition is applied to a glass substrate.

The peel strength is about 21.5 pounds per square inch.

EXAMPLE 11

In accordance with the procedure described in example 5, the following primer compositions were applied to the following substrates. The results of these tests are illustrated in table I.

TABLE I

| Example | Titanium compounds | Parts | Silicate | Parts | Solvent | Gl | SS | Al | P |
|---|---|---|---|---|---|---|---|---|---|
| A | $Ti_2O(OC_3H_7)_6$ | 6 | | | Ligroin | A | C | A | D |
| B | $Ti_2O(OC_3H_7)_6$ | 3 | | | do | A | C | B | D |
| C | $Ti_2O(OC_3H_7)_6$ | 1.5 | | | do | A | D | B | D |
| D | $Ti_2O(OC_3H_7)_6$ | 9 | $(C_2H_5O)_4Si$ | 9 | do | A | D | B | D |
| E | $Ti_2O(OC_3H_7)_6$ | 9 | $(C_2H_5O)_4Si$ | 6 | do | A | A | A | B |
| F | $Ti_2O(OC_3H_7)_6$ | 9 | $(C_2H_5O)_4Si$ | 3 | do | A | A | A | B |
| G | $Ti_2O(OC_3H_7)_6$ | 9 | $(C_2H_5O)_4Si$ | 1.5 | do | A | A | A | B |
| H | $Ti_2O(OC_3H_7)_6$ | 6 | $(C_2H_5O)_4Si$ | 6 | do | A | A | A | B |
| I | $Ti_2O(OC_3H_7)_6$ | 3 | $(C_2H_5O)_4Si$ | 6 | do | A | B | B | B |
| J | $Ti_2O(OC_3H_7)_6$ | 1.5 | $(C_2H_5O)_4Si$ | 6 | do | A | B | B | C |
| K | $Ti_2O(OC_3H_7)_6$ | 0.75 | $(C_2H_5O)_4Si$ | 6 | do | D | D | D | F |
| L | $Ti_2O(OC_3H_7)_6$ | 9 | ES-40 | 9 | do | D | F | F | F |
| M | $Ti_2O(OC_3H_7)_6$ | 9 | ES-40 | 9 | do | A | A | A | B |
| N | $Ti_2O(OC_3H_7)_6$ | 9 | ES-40 | 6 | do | A | A | A | B |
| O | $Ti_2O(OC_3H_7)_6$ | 3 | ES-40 | 6 | do | A | A | A | B |
| P | $Ti_2O(OC_3H_7)_6$ | 6 | ES-40 | 6 | do | A | A | A | B |
| Q | $Ti_2O(OC_3H_7)_6$ | 6 | ES-40 | 3 | do | A | C | A | B |
| R | $Ti_2O(OC_3H_7)_6$ | 3 | ES-40 | 3 | do | A | C | A | C |
| S | $Ti_3O_4(OC_4H_9)_4$ | 6 | $(C_2H_5O)_4Si$ | 6 | do | A | D | A | B |
| T | $Ti_3O_4(OC_4H_9)_4$ | 6 | $(C_3H_7O)_4Si$ | 6 | do | A | A | A | B |
| U | $Ti_3O_4(OC_4H_9)_4$ | 6 | $(CH_3OC_2H_5O)_4Si$ | 6 | do | A | A | A | B |
| V | $Ti_6O_4(OC_5H_{11})_{16}$ | 6 | ES-40 | 6 | do | A | A | A | B |
| W | $Ti_6O_4(OC_5H_{11})_{16}$ | 6 | $(C_2H_5O)_4Si$ | 6 | do | A | A | A | B |
| X | $Ti_{21}O_{24}(OiC_3H_7)_{36}$ | 6 | $(C_2H_5O)_4Si$ | 6 | do | A | A | A | C |
| Y | $Ti_{21}O_{24}(OiC_3H_7)_{36}$ | 6 | ES-40 | 6 | do | A | A | A | B |

Silicate: ES-40=ethyl silicate "40".
Substrates: Gl=Glass; SS=Stainless steel; Al=Aluminum; P=Filled polystyrene tile.

EXAMPLE 12

Grafted organopolysiloxanes are prepared by grafting olefinic compounds to hydroxyl-terminated organopolysiloxanes by reacting a mixture consisting of polydimethylsiloxanes and olefinic compounds in the presence of a free-radical initiator at a temperature of from about 60° to about 190° C. The unreacted olefinic compounds are removed at an elevated temperature by applying a vacuum of about 1 mm. or less Hg while continuing to heat and stir for an additional hour. The present data is illustrated in table II.

| Example No. | Olefinic compound Type | Parts | Hydroxylated fluid Viscosity | Parts | Free radical initiator Type | Parts | Reaction conditions Temp., °C. | Time, hr. | Final polymer viscosity, cs. |
|---|---|---|---|---|---|---|---|---|---|
| 12(a) | Acrylonitrile | 14.6 | 1,900 | 50 | t-BP | 0.5 | 80 | 1.5 | 14,000 |
|  | Butylacrylate | 35.4 |  |  |  |  |  |  |  |
| 12(b) | Acrylonitrile | 9.0 | 800 | 40 | t-BP | 0.5 | 80 | 1.7 | 7,800 |
|  | Butylacrylate | 51.0 |  |  |  |  |  |  |  |
| 12(c) | Acrylonitrile | 9.1 | 800 | 40 | t-BP | 0.25 | 80 | 2.0 | 20,200 |
|  | Ethylacrylate | 2.9 |  |  |  |  |  |  |  |
|  | Butylacrylate | 48.0 |  |  |  |  |  |  |  |
| 12(d) | Methylacrylate | 50.0 | 400 | 50 | t-BP | 0.5 | 80 | 4.0 | 15,500 |
| 12(e) | Laurylmethacrylate | 70.0 | 400 | 30 | t-BP | 0.5 | 80 | 5.0 | 19,400 |
| 12(f) | Styrene | 250.0 | 610 | 304 | t-BP | 2.0 | 125 | 24.0 | 14,500 |
|  | Butylacrylate | 204.0 |  |  |  |  |  |  |  |
| 12(g) | Vinyl chloride | 45.0 | 6,700 | 350 | t-BPr | 1.8 | 80 | 4.0 | 17,800 | t-BP=tertiary butyl peroxide.
t-BPer=tertiary butyl peroctoate.

EXAMPLE 13

In accordance with the procedure described in example 5, various titanium compounds are mixed with organosilicates in the presence of a solvent and applied to various substrates. The primer composition is dried and a grafted organopolysiloxane prepared in accordance with the procedure described in example 12 is then applied using various organoacyloxysilanes. The results of these tests are illustrated in table III.

TABLE III

| Example | Grafted polysiloxane example No. | Titanium compounds | Parts | Silicate | Parts | Solvent | Substrate Gl | SS | Al |
|---|---|---|---|---|---|---|---|---|---|
| A | 12(a) | Ti$_2$O(OC$_3$H$_7$)$_6$ | 6 |  |  | Ligroin | C | F | D |
| B | 12(a) | Ti$_2$O(OC$_3$H$_7$)$_6$ | 3 |  |  | do | C | F | D |
| C | 12(a) | Ti$_2$O(OC$_3$H$_7$)$_6$ | 1.5 |  |  | do | D | F | D |
| D | 12(a) | Ti$_2$O(OC$_3$H$_7$)$_6$ | 6 | (C$_2$H$_5$O)$_4$Si | 6 | do | A | A | A |
| E | 12(a) | Ti$_2$O(OC$_3$H$_7$)$_6$ | 6 | (C$_2$H$_5$O)$_4$Si | 3 | do | A | A | A |
| F | 12(a) | Ti$_2$O(OC$_3$H$_7$)$_6$ | 6 | (C$_2$H$_5$O)$_4$Si | 1.5 | do | D | D | D |
| G | 12(a) | Ti$_2$O(OC$_3$H$_7$)$_6$ | 3 | (C$_2$H$_5$O)$_4$Si | 6 | do | A | D | D |
| H | 12(a) | Ti$_2$O(OC$_3$H$_7$)$_6$ | 6 | ES-40 | 6 | do | A | B | B |
| I | 12(a) | Ti$_2$O(OC$_3$H$_7$)$_6$ | 6 | ES-40 | 3 | do | A | A | A |
| J | 12(a) | Ti$_2$O(OC$_3$H$_7$)$_6$ | 3 | ES-40 | 6 | do | A | A | A |
| K | 12(b) | Ti$_3$O$_4$(OC$_4$H$_9$)$_6$ | 6 | ES-40 | 3 | do | A | A | A |
| L | 12(c) | Ti$_6$O$_4$(OC$_5$H$_{11}$)$_{16}$ | 6 | ES-40 | 6 | do | A | A | A |
| M | 12(c) | Ti$_{21}$O$_{24}$(OiC$_3$H$_7$)$_{36}$ | 6 | ES-40 | 3 | do | A | A | A |
| N | 12(d) | Ti$_{21}$O$_{24}$(OiC$_3$H$_7$)$_{36}$ | 6 | ES-40 | 6 | do | A | A | A |
| O | 12(e) | Ti$_{21}$O$_{24}$(OiC$_3$H$_7$)$_{36}$ | 6 | (C$_3$H$_7$O)$_4$Si | 3 | do | A | A | A |
| P | 12(f) | Ti$_3$O$_4$(OC$_5$H$_{17}$)$_6$ | 6 | (C$_3$H$_7$O)$_4$Si | 3 | do | A | A | A |
| Q | 12(g) | Ti$_3$O$_4$(OC$_5$H$_{17}$)$_6$ | 6 | (C$_3$H$_7$O)$_4$Si | 3 | do | A | A | A |

Silicate: ES-40=ethyl silicate "40."
Substrates: Gl=Glass; SS=Stainless steel; Al=Aluminum.
Rating of adhesive characteristics: A=Excellent adhesion; B=Good adhesion; C=Partial adhesion; D=Poor adhesion; F=No adhesion.

Even though the ratio of condensed titanium compounds to organosilicates is not critical, these tables illustrate that excellent adhesion is obtained when the ratio of condensed titanium compounds to organosilicates is in the range of from 1:1 and preferably 2:1 or above.

When the above examples are repeated using other condensed titanium compounds and other organosilicates, substantially the same results are obtained as those illustrated above.

Although specific examples of the invention have been described herein, other variations and modifications falling within the sphere and scope of the appended claims are to be included therein.

The invention claimed is:

1. A substrate having deposited thereon in the order named (1) a composition comprising (a) from 2 to 50 percent by weight of a condensed hydrocarbon soluble titanium compound of the general formula (Ti)$_n$(O)$_m$(OR)$_p$ wherein R is an organic group having from one to 20 carbon atoms, n is an integer of at least 2, m is an integer of at least 1 and p is an integer of at least 4 and (b) from 2 to 30 percent by weight of a silicate selected from the class consisting of lower alkyl orthosilicates, alkoxy and chloro-substituted lower alkyl silicates, aryl silicates, chloro-substituted aryl silicates, lower alkyl polysilicates and hydrolyzed lower alkyl silicates, the ratio of the titanium compound to silicate in said composition being from about 0.25 to 5:1 and (II) an organopolysiloxane containing terminal hydrolyzable groups in which the organo groups are selected from the class consisting of monovalent hydrocarbon radicals, halogenated monovalent hydrocarbon radicals and cyanoalkyl radicals, said organopolysiloxane being room temperature curable by virtue of said hydrolyzable 2. The coated substrate of claim 1 wherein the organopolysiloxane has the following formula:

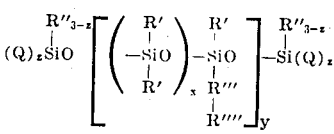

wherein R' and R'' are selected from the group consisting of monovalent hydrocarbon radicals, halogenated monovalent hydrocarbon radicals, cyanoalkyl radicals; R''' is selected from the group consisting of divalent hydrocarbon radicals, divalent halogenated hydrocarbon radicals; R'''' is a polymeric organic side chain constituted of recurring units derived from unsaturated organic monomers containing aliphatic unsaturation and linked to R''' via an alkylene group; Q is an organic group hydrolyzable by ambient moisture; x is an integer of from 0 to 20,000; y is an integer of from 1 to 500 and z is an integer of at least 1.

3. The coated substrate of claim 1 wherein the organopolysiloxane has the following formula:

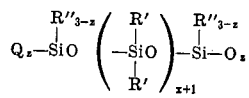

wherein R' and R'' are selected from the group consisting of monovalent hydrocarbon radicals and cyanoalkyl radicals; Q is an organic group hydrolyzable by ambient moisture; $x$ is an integer of from 0 to 20,000; $y$ is an integer of from 1 to 500 and $z$ is an integer of at least 1.

4. The coated substrate of claim 1 wherein the condensed titanium compound is of the formula $(Ti_2O)(OiC_3H_7)_6$.

5. The coated substrate of claim 1 wherein the substrate is metal, or glass, or synthetic organic polymers.

* * * * *